(12) United States Patent
Liang et al.

(10) Patent No.: US 9,938,468 B2
(45) Date of Patent: Apr. 10, 2018

(54) METHOD FOR PREPARING FUEL BY USING BIOLOGICAL OILS AND FATS

(75) Inventors: Changhai Liang, Dalian (CN); Bin Xu, Hong Kong (CN); Philip Siu, North Point (CN); Lei Wang, Dalian (CN); Xiao Chen, Dalian (CN); Zhengfeng Shao, Dalian (CN); Zihui Xiao, Dalian (CN)

(73) Assignees: ECO ENVIRONMENTAL ENERGY RESEARCH INSTITUTE LIMITED, Hong Kong (CN); DALIAN UNIVERSITY OF TECHNOLOGY, Dalian (CN)

( * ) Notice: Subject to any disclaimer, the term of this patent is extended or adjusted under 35 U.S.C. 154(b) by 281 days.

(21) Appl. No.: 14/126,007

(22) PCT Filed: Jun. 12, 2012

(86) PCT No.: PCT/CN2012/000790
§ 371 (c)(1),
(2), (4) Date: Feb. 3, 2014

(87) PCT Pub. No.: WO2012/171326
PCT Pub. Date: Dec. 20, 2012

(65) Prior Publication Data
US 2014/0135542 A1    May 15, 2014

(30) Foreign Application Priority Data
Jun. 13, 2011    (CN) .......................... 2011 1 0157081
Dec. 16, 2011    (CN) .......................... 2011 1 0425819

(51) Int. Cl.
*C10G 3/00* (2006.01)
*C11B 3/12* (2006.01)
(Continued)

(52) U.S. Cl.
CPC ............... *C10G 3/50* (2013.01); *C10G 3/42* (2013.01); *C10G 3/49* (2013.01); *C10G 11/05* (2013.01);
(Continued)

(58) Field of Classification Search
CPC combination set(s) only.
See application file for complete search history.

(56) References Cited

U.S. PATENT DOCUMENTS 4,399,234 A * 8/1983 Beuther ............... C07C 1/0435
                                                  518/715
4,599,480 A * 7/1986 Buddell ................ B01J 12/005
                                                  208/106

(Continued)

FOREIGN PATENT DOCUMENTS

CN    1412278 A    4/2003
CN    1858161 A    11/2006
(Continued)

OTHER PUBLICATIONS

Harmsen, G.J. "RFP-5 Catalytic Distillation", 18th World Petroleum Congress, Sep. 25-29, Johannesburg, South Africa (Published 2005).*
(Continued)

*Primary Examiner* — Philip Louie
*Assistant Examiner* — Aaron Pierpont
(74) *Attorney, Agent, or Firm* — Baker McKenzie LLP

(57) ABSTRACT

A new method of producing fuel from biological oils and fats is provided, which comprises the following steps: (a) proceeding with a catalytic cracking-deoxygenation reaction for the biological oils and fats under heating in the presence of a cracking-deoxygenation catalyst; (b) mixing the product of step (a) with hydrogen gas; and (c) proceeding with a catalytic hydrodeoxygenation reaction for the mixture from
(Continued)

step (b) under heating in the presence of a hydrodeoxygenation catalyst. By means of the method of the present invention, clean fuel produced by using biological oils and fats as raw materials is compatible with the fuel composition produced from crude oil refining.

21 Claims, 1 Drawing Sheet

(51) Int. Cl.
*C11C 3/12* (2006.01)
*C10G 65/12* (2006.01)
*C10G 69/04* (2006.01)
*C10G 11/05* (2006.01)

(52) U.S. Cl.
CPC ............ *C10G 65/12* (2013.01); *C10G 69/04* (2013.01); *C11B 3/12* (2013.01); *C11C 3/12* (2013.01); *C10G 2300/1011* (2013.01); *C10G 2400/02* (2013.01); *C10G 2400/04* (2013.01); Y02P 30/20 (2015.11)

(56) References Cited

U.S. PATENT DOCUMENTS

| | | | |
|---|---|---|---|
| 5,336,841 A * | 8/1994 | Adams | C07C 7/148 203/28 |
| 6,100,435 A * | 8/2000 | Silverberg | C07C 13/10 203/DIG. 6 |
| 7,982,075 B2 | 7/2011 | Marker et al. | |
| 8,084,655 B2 | 12/2011 | Dindi et al. | |
| 8,119,847 B2 | 2/2012 | Dindi et al. | |
| 2006/0186020 A1 | 8/2006 | Gomes | |
| 2006/0207166 A1 | 9/2006 | Herskowitz et al. | |
| 2007/0102481 A1* | 5/2007 | Kato | B23K 1/0016 228/101 |
| 2008/0312480 A1 | 12/2008 | Dindi et al. | |
| 2009/0077867 A1* | 3/2009 | Marker | C01B 3/16 44/308 |
| 2009/0158637 A1 | 6/2009 | McCall et al. | |
| 2009/0193709 A1 | 8/2009 | Marker et al. | |
| 2010/0043278 A1 | 2/2010 | Brevoord et al. | |
| 2010/0317903 A1 | 12/2010 | Knuuttila | |
| 2011/0011721 A1 | 1/2011 | Champagne | |
| 2012/0203042 A1 | 8/2012 | Huber et al. | |

FOREIGN PATENT DOCUMENTS

| | | |
|---|---|---|
| CN | 101070483 A | 11/2007 |
| CN | 101230309 A | 7/2008 |
| CN | 101270300 A | 9/2008 |
| CN | 101294091 A | 10/2008 |
| CN | 101314748 A | 12/2008 |
| CN | 101328418 A | 12/2008 |
| CN | 101423451 A | 5/2009 |
| CN | 101460595 A | 6/2009 |
| CN | 101475870 A | 7/2009 |
| CN | 101720349 A | 6/2010 |
| CN | 101842465 A | 9/2010 |
| CN | 101899326 A | 12/2010 |
| CN | 102250634 A | 11/2011 |
| WO | 2007/003709 A1 | 1/2007 |
| WO | 2008114033 A2 | 9/2008 |
| WO | 2009002065 A1 | 12/2008 |
| WO | 2009039347 A1 | 3/2009 |
| WO | 2011031320 A2 | 3/2011 |

OTHER PUBLICATIONS

Buzetzki, E.; Svanova, K.; Cvengrosoca, Z.; Mikulec, J.; Kaszonyi, A.; Cvengros, J. "Liquid condensates from oil/fat cracking as components of blended diesel fuels". 44th International Petroleum Conference, Bratislava, Slovak Republic, Sep. 21-22, 2009; pp. 1-10.*

Bocianowski, J.; Mikolajczyk, K. "Determination of fatty acid composition in seed oil of rapeseed (*Brassica napus* L.) by mutated alleles of the FAD3 desaturase genes"; J. Appl. Genetics (Sep. 13, 2011), 53, pp. 27-30.* de Klerk, A.; Furimsky, E. "Catalysis in the Refining of Fischer-Tropsch Syncrude", RSC: Cambridge (2010), p. 135.*

Sakuth, M.; Reusch, D.; Janowsky, R. "Reactive Distillation". In Ullmann's Encyclopedia of Industrial Chemistry , 31 (Published online Jan. 11, 2008) pp. 264-276; http://onlinelibrary.wiley.com/doi/10.1002/14356007.c22_c01.pub2/pdf.*

Chinese Rejection Notice, Chinese Application No. 201210193332.7, dated Jul. 25, 2014, 5 pages.

Chinese Office Action, 201210193332.7, dated Nov. 22, 2013, 12 pages, prior art cited listed on p. 1.

International Search Report, PCT/CN2012/000790, dated Sep. 20, 2012, 8 pages.

Liu, Y., et al., "Hydrotreatment of Jatropha Oil to Produce Green Diesel over Trifunctional Ni—Mo/SiO2—Al2O3 Catalyst," Chemistry Letters, vol. 38, No. 6, (2009), 2 pages.

Chinese Office Action, CN Application No. 201210193332.7, dated Apr. 1, 2014, searched documents listed on p. 1 and p. 6.

Junming, X., et al., "Bio-oil upgrading by means of ethyl ester production in reactive distillation to remove water and to improve storage and fuel characteristics," Biomass and Bioenergy, vol. 32, (2008), pp. 1056-1061.

Extended European Search Report, EP Appl. No. 12800464.5 (PCT/CN2012/000790), dated May 15, 2015, 7 pages.

* cited by examiner

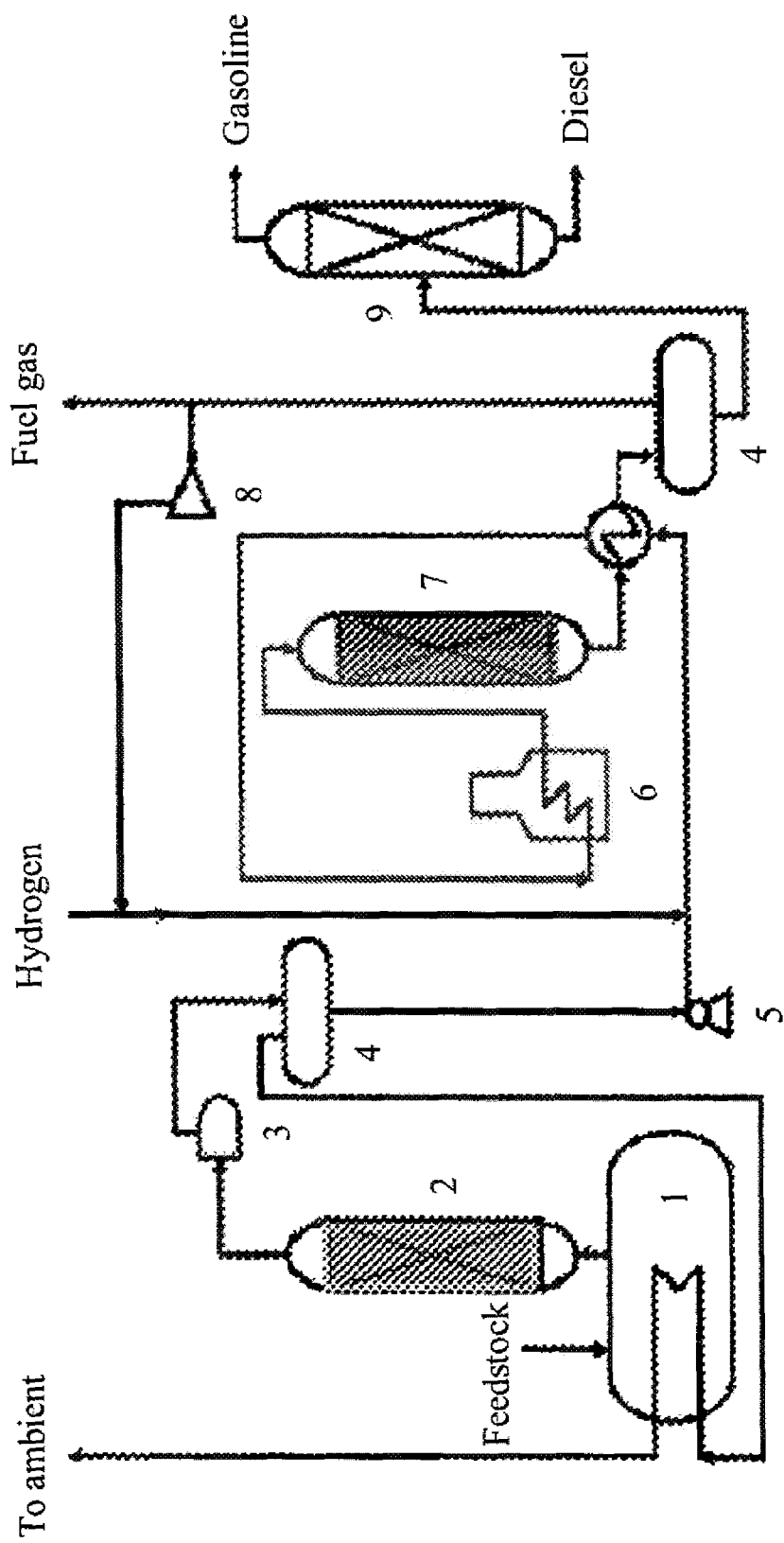

METHOD FOR PREPARING FUEL BY USING BIOLOGICAL OILS AND FATS

TECHNICAL FIELD

The present invention relates to the field of energy technology, and especially to a method for preparing fuel by using biological oils and fats.

BACKGROUND ARTS

People are compelled to search for renewable clean fuel as petrochemical fuel is in shortage more than ever and pollutes the environment upon combustion. In a substitutive solution for petrochemical fuel, producing clean fuel from renewable biological oils and fats (such as soybean oil, Jatropha oil, lard, food waste oil) is considered as a green, renewable, carbon-neutral technical route.

Biological oils and fats, such as vegetable oils and fats, which are fats obtained by extracting seeds, the flesh of fruit, and other parts of plants, contain a lot of triglycerides with long-chain carbons and free fatty acids. According to their usage, biological oils and fats can be divided into two categories—to be used for food and to be used in industry. Those in liquid at room temperature are called oils, while those in solid and semi-solid at room temperature are called fats. The components of biological oils and fats are quite different from those of crude oil (including waste lubricating oil) mainly in that, for biological oils and fats, the content of oxygen is high and the contents of sulfur, nitrogen and aromatic hydrocarbons are low; while for crude oil, contents of sulfur, nitrogen and aromatic hydrocarbons are high and content of oxygen is low. Therefore, due to the differences of their components, methods for producing fuel from crude oil as raw material are not applicable to the processing of biological oils and fats as raw materials.

Currently, there are some technical solutions, which are used or will be used in industry, for preparing biomass fuel (such as biodiesel) from biological oils and fats. Generally, such technical solutions are classified into two categories: processes of transesterification and processes of direct hydrogenation. Many research results and technical reports involve the foregoing techniques.

Chinese Patent Application Publication No. CN 101328418A teaches a method for manufacturing biodiesel by using vegetable oils. However, a great amount of ethanol is consumed firstly to form fatty acid ester through reacting with the vegetable oil. Chinese Patent Application Publication No. CN1858161A teaches a method for preparing biodiesel from palm oil, in which it is required that the raw material of palm oil proceed with the procedures, such as degumming, deacidifying and dehydrating, etc. before the step of esterifying with low-carbon alcohols. Chinese Patent Application Publication No. CN101230309A teaches a method for preparing biodiesel through reducing the high acid value of palm oil, in which, two esterification procedures are required. Moreover, methanol required in the method is in an amount 6-9 times (molar ratio) of that of the oil in the trans esterification reaction. Furthermore, methanol is not recycled in the process, and therefore the method is neither environmentally friendly or economical.

The aforementioned processes in the prior art are complicated in regard to the procedures, are difficult to operate and require high energy consumption. Moreover, a large amount of alcohols, such as methanol or ethanol etc., is involved in the process of transesterification, which results in the production cost increasing greatly.

Besides, Chinese Patent Application Publication No. CN101070483A teaches a method for producing biodiesel with Saueda Salsa seed oil, in which a lot of water is required for washing the product after transesterification. Chinese Patent Application Publication No. CN1412278A teaches a method for preparing biodiesel by utilizing high acid oils and fats as well as palm oil together with a strong acid as catalyst. However, when the method proceeds, a lot of waste water would be produced and the reactor would corrode badly. All aforementioned processes in the prior art produce a lot of waste water, which not only increases production costs, but also goes against environmental protection and economic benefit.

Regarding direct hydrogenating technique, WO2009/039347 teaches a process for producing diesel fractions by treating biorenewable feedstock, in which a two-step-approach, i.e., hydrodeoxygenation and hydroisomerization, is employed. US2006/0207166 has a process, in which hydrodeoxygenation and hydroisomerization take place simultaneously. A common defect of these processes lay in the poor stability of the catalyst and the high consumption for hydrogen, which will be more serious for vegetable oils and animal fats with high oxygen contents.

Particularly, the technique of direct hydrogenation is restricted by the contents of free fatty acids in raw materials. Up to now, only raw material containing up to 15% of free fatty acids is disclosed in the prior art documents, which is used to produce hydrocarbon fuel through direct hydrogenation (Yanyong Liu et al., Chem. Lett. 2009, 38, 552).

In general, in the processes currently used for preparing diesel fuel from biological oils and fats, transesterification is employed to produce biodiesel by means of transesterification from biological oils and fats in which a lot of low-carbon alcohol is consumed and therefore, production costs are increased. In the transesterification process, a strong acid is employed as a catalyst which corrodes the production apparatuses badly, and at the same time, a follow-up separation procedure is required for handling a large amount of glycerol, which is a by-product generated in the process. After the transesterification process, a large volume of waste water will be produced. In some transesterification processes, multiple transesterification procedures are involved, which results in the operation being very cumbersome. On the other hand, direct hydrogenation produces diesel through hydrodeoxygenation for animal and vegetable oils and fats directly, which is not only of high hydrogen consumption, but also of fast catalyst inactivation. Since the oxygen content in raw material oils is 10%-15%, a large amount of reaction heat will be produced. It is a hard-resolved problem to control the reaction temperature so as to prevent catalyst from fast inactivation. Furthermore, a large amount of hydrogen gas for replenishing and for quenching is required to maintain the hydrogen partial pressure as the consumption of hydrogen gas for processing the raw material oils is relatively high.

There are still some other processes in the art for preparing diesel fuel by using biological oils and fats. For example, US2006/0186020 discloses a process of coprocessing vegetable oils and crude oil, in which the content of vegetable oils is between 1-75% and vegetable oils are not used alone. Chinese Patent Application Publication No. CN10101314748A discloses a method for catalytically converting animal and vegetable oils and fats to obtain a product with mainly $C_2$-$C_4$ alkenes as its ingredients and only 45% overall yield. Only a small amount of components for gasoline and diesel can be produced from the process.

Furthermore, there is no hydrorefining procedure for gasoline and diesel involved in the process.

Chinese Patent Publication No. CN101475870A teaches a process of catalytic cracking distillation for hydrocarbons consisting of mainly waste lubricating oil sources. In this process, the waste lubricating oil to be treated mainly consists of alkanes, and the catalytic cracking breaks down C—C bonds selectively. The main reaction is shown as follows:

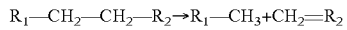

$$R_1-CH_2-CH_2-R_2 \rightarrow R_1-CH_3+CH_2=R_2$$

No water ($H_2O$) is produced in this cracking reaction, thus the water-resistance of the catalyst is not required to be taken into account. Waste lubricating oil mainly consists of alkanes, which form alkanes and alkenes directly after catalytic cracking. However, as above mentioned, the composition of biological oils and fats is quite different from that of crude oil (including waste lubricating oil), in which the main components of biological oils and fats have high oxygen content. If cracking is carried out, factors, such as C—O bond cracking and water produced, should be taken into account, as there are great differences in catalytic mechanism and the hydrothermal stability of the catalyst. As a result, the process taught by Chinese Patent Application Publication No. CN101475870A is not applicable to biological oils and fats.

In conclusion, as for the prior art, although there are many routes and research results disclosed for processing and manufacturing biodiesel by using biological oils and fats as raw materials, biodiesel prepared by these processes is not considered by far an ideal diesel blending component as the obtained biodiesel has high density, low blending ratio with diesel components from petroleum, low heat value, and is less economical as a fuel when it is blended with diesel components from petroleum.

Contents of the Invention

In order to solve the above problems, the present invention provides a novel process for treating biological oils and fats. High quality biomass fuel that is very suitable to be used as a blending component of diesel is obtained.

Specifically, the present invention provides a method for preparing biomass fuel, in which biological oils and fats are used as raw materials and the composition of the biomass fuel thus obtained is equivalent to that obtained from crude oil refining. The process comprises the following steps: (a) proceeding with a catalytic cracking-deoxygenation reaction under heating in the presence of a cracking-deoxygenation catalyst for the biological oils and fats; (b) mixing the product of step (a) with hydrogen gas; and (c) proceeding with a catalytic hydrodeoxygenation reaction under heating in the presence of a hydrodeoxygenation catalyst for the mixture from step (b). According to actual demands, the product of step (c) may be further fractionated. Generally, it may be also considered to mix hydrogen gas with the product of catalytic cracking-deoxygenation reaction before the hydrogen gas is injected into the reaction reactor for the reaction of step (c), whereas the hydrogen gas may also be injected into the reaction reactor directly followed by being mixed with the product of catalytic cracking-deoxygenation reaction for the reaction of step (c).

As for the process of the present invention, it is characterized in that a double-deoxygenation-procedure, i.e., a catalytic cracking-deoxygenation procedure and a catalytic hydrodeoxygenation procedure, is employed, and therefore, the defects of large heat release and fast inactivation of the catalyst caused by the direct hydrogenation used in the prior art can be avoided, and the consumption of hydrogen gas can be reduced greatly at the same time. Moreover, each procedure in the process of the present application, e.g., the catalytic cracking-deoxygenation procedure and the catalytic hydrodeoxygenation procedure, can be combined flexibly, i.e., can operate either continuously or separately. Waste residue and waste gas produced from the process can be utilized comprehensively for heating, which makes the whole production process more energy efficient and environmentally friendly.

DESCRIPTION OF FIGURES

The FIGURE illustrates one example of the process according to the invention.

Reference signs for main assemblies are as follows:
1 Distillation still
2 Catalytic distillation tower
3 Condenser
4 Vapor-liquid separator
5 Liquid feeding pump
6 Heating furnace
7 Hydrorefining reaction reactor
8 Hydrogen gas positive booster
9 Atmospheric distillation tower

MODE OF CARRYING OUT THE INVENTION

The specific examples of the present invention will be further illustrated by referring to accompanying FIGURES.

Biological oils and fats indicated in the present invention are animal sources, plant sources, microorganism sources or mixtures thereof. Biological oils and fats either for foods or for industry can be used. In general, biological oils and fats are rich in triglycerides and free fatty acids, and the chain length of the fatty acids is normally $C_{12}$-$C_{24}$, and mostly $C_{16}$ and $C_{18}$. The examples of biological oils and fats comprise, but do not limit to, rapeseed oil, soybean oil, palm oil, sunflower seed oil, cottonseed oil, Jatropha oil, olive oil, castor oil, micro algae oil, tallow, lard, butter, poultry fats, fish oil, food waste oil and the like. Vegetable oils and fats are a preferred raw material in an example.

The fuel prepared by the present invention is usually called biomass fuel, which means a solid, a liquid or a gas, consisting of or being extracted from biomass. The so-called biomass herein is organic living organisms or metabolic products of organic living organisms. In a preferred embodiment, the composition of the produced biodiesel by this process is equivalent to that of the petroleum diesel obtained by refining petrochemical raw materials (such as crude oil), in which both of them are of high degree compatibility. The biodiesel and the petroleum diesel can be blended sufficiently with each other, and the diesel thus blended has properties and an application scope the same as those of petroleum diesel.

The present invention employs a double-deoxygenation-procedure, i.e., a catalytic cracking-deoxygenation procedure and a catalytic hydrodeoxygenation procedure. Firstly, a procedure of combining catalytic cracking with distillation is employed to treat biological oils and fats, in which a part of oxygen in the raw material is removed. Then, the remained oxygen is removed through catalytic hydrogenation reaction. Since hydrogen gas is not required in the step of catalytic cracking-deoxygenation and most oxygen has been removed, the consumption of hydrogen gas can be lowered greatly in the following step of catalytic hydrodeoxygenation.

In the step of catalytic cracking-deoxygenation, oxygen in free fatty acids is removed partially by decarbonylation, or by decarboxylation with CO, H$_2$O and alkenes generated, and at the same time, triglycerides decarbonylate through cracking. Long chain alkanes and alkenes, CO$_2$, CO, H$_2$O, as well as propylene or propane are generated accordingly by decarboxylation. The chemical reactions of which are as follows:

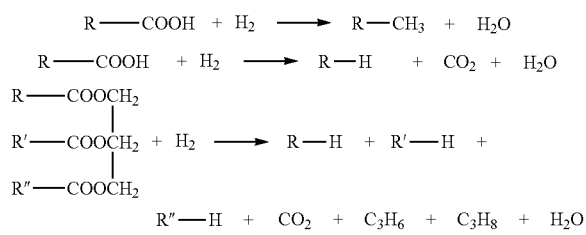

In this step, some side reactions which are not relevant to cracking-deoxygenation, such as the reaction for breaking C—C bonds, also occur at the same time.

Since water is generated in this step, the cracking-deoxygenation catalyst should be of strong water-resistance. Moreover, in the catalytic cracking reaction for biological oils and fats, usually not only C—C broken but also C—O breaking occurs. For this reason, the catalyst may be modified for breaking bonds selectively, i.e. only C—O is broken while C—C breaking does not occur. As element oxygen usually still exists in the fraction after the selective C—O breaking, a further step of deoxygenation proceeds.

Under the condition for catalytic hydrodeoxygenation, n-paraffin is generated by the reactions of hydrosaturation, hydrodecarboxylation, hydrodecarbonylation and hydrodeoxygenation for triglycerides. The chemical reactions which occur as follows:

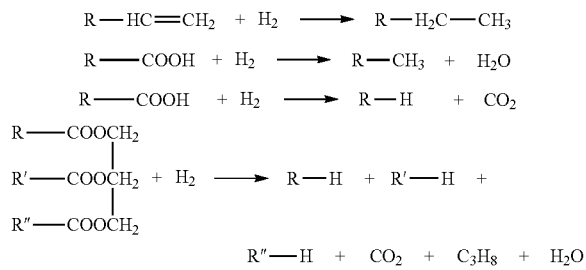

In all of the above chemical formulas, R is an alkyl of C$_{10}$-C$_{22}$. Some side reactions, which are mainly hydrogenolysis for C—C bonds to generate smaller hydrocarbon molecules, occur at the same time.

The oxygen-containing fractions remained after the catalytic cracking-deoxygenation are further removed through the above-mentioned hydrodeoxygenation, while the alkenes produced in the catalytic cracking are saturated, and thus a product with high stability is obtained.

The advantages of the present invention lie in that the fraction obtained by the catalytic cracking-deoxygenation is further subjected to a hydrodeoxygenation. The conditions for these reactions are moderate with low hydrogen partial pressure and low reaction temperature. The catalyst used in the process is of acceptable stability. The consumption of hydrogen is low. Existing equipments in an oil refinery can be utilized to the greatest extent.

The biomass fuel produced according to the present invention can be used as a fuel directly, such as gasoline, diesel, aviation kerosene and the like, or can be used as a blending component. The biomass fuel comprises mainly the components with carbon chains of C$_8$-C$_{24}$ with a cetane number being higher than that of the traditional petroleum diesel, and a lower density. The biomass fuel contains almost no sulfur, nitrogen and aromatic hydrocarbons. Based on the above characteristic properties, the clean fuel prepared according to the present invention is an ideal and high quality diesel blending component, which can be blended with a low value oil (with a lower cetane number) produced by hydrogenating light catalytic cycle oil, so as to produce ultra low sulfur diesel which meets the requirements of the relevant standards.

The present invention is mainly on the basis of the two-step-deoxygenation, i.e., catalytic cracking-deoxygenation and catalytic hydrodeoxygenation. These two steps can be combined very flexibly, which can be operated either continuously or separately. Specifically, a first reaction sector for catalytic cracking-deoxygenation and a second reaction sector for catalytic hydrodeoxygenation can be operated continuously or in batch according to the actual operation conditions for the application.

With respect to the industrial application, it is preferred that the step of hydrodeoxygenation operates continuously, in which advantages of stable reaction conditions and stable products are obtained; while it is preferred that the step of catalytic cracking-deoxygenation in the first reaction sector operates in batch. However, if a requirement for a continuous operation for hydrodeoxygenation is met, the step of catalytic cracking-deoxygenation may employ a circulating operation with multiple distillation stills or may employ continuous catalytic distillation operation.

The cracking-deoxygenation catalyst used in the first reaction sector is, such as, but not limited to, molecular sieve catalyst. Other suitable cracking-deoxygenation catalysts can refer to "Industrial Catalysts Handbook" (HUANG Zhongtao, Chemical Industry Press, 2004; which is incorporated into the Description of the present Application as reference herein). In one embodiment, a mixture of aluminum oxide and molecular sieve is used as a cracking catalyst. Molecular sieve may be selected from HY, Hβ, SAPO-31, HZSM-5, HZSM-22 or mixtures of the random combinations of any above ingredients. The content of molecular sieve may be about 5-70 wt %. After aluminum oxide being mixed with molecular sieve, a binder (such as Sesbania powder) is added for extrusion molding. The size of the molded cracking-deoxygenation catalyst depends on the actual conditions of the first reaction sector, such as the diameter of the catalytic distillation tower. In one embodiment, a ratio of the equivalent diameter of the molded cracking-deoxygenation catalyst to the diameter of the catalytic distillation tower should be less than 0.1.

The ratio of cracking-deoxygenation catalyst to the raw material that are fed into the first reaction sector is not required to be limited specifically but is determined according to the actual conditions of the application. In one embodiment, the mass ratio of cracking-deoxygenation catalyst to biological oils and fats can be about 1:5 to 1:50 according to the process load of the reaction, i.e., it can be 1:5, 1:10, 1:15, 1:20, 1:30, 1:40, 1:50 etc. In one embodiment, the mass ratio of cracking-deoxygenation catalyst to biological oils and fats is preferably 1:20. In another embodiment, the mass ratio of cracking-deoxygenation catalyst to biological oils and fats is preferably 1:10.

In some embodiments, the catalytic cracking-deoxygenation in the first reaction sector can proceed under heating at about 100-600° C., thereby to obtain products of cracking-deoxygenation, such as alkenes, alkanes, carbon monoxide, carbon dioxide, water, etc. In one embodiment, the catalytic cracking-deoxygenation proceeds at 100° C., 200° C., 250° C., 300° C., 350° C., 400° C., 450° C., 500° C., 600° C. or any temperature between any two of the above values. In this case, the composition of raw material oils may have influence on the temperature selection. The temperature of cracking-deoxygenation is generally determined by the distillation range of the raw material oils. In one embodiment, about 300-600° C. is preferred.

The product from the first reaction sector is mixed with hydrogen gas sufficiently, and then, the mixture is guided into the second reaction sector containing hydrodeoxygenation catalyst to proceed with catalytic hydrodeoxygenation.

The hydrodeoxygenation catalyst used in the second reaction sector is, such as, but not limited to, a supported metal catalyst. Other suitable hydrodeoxygenation catalysts can refer to "Industrial Catalysts Handbook" (HUANG Zhongtao, Chemical Industry Press, 2004) and "Hydrorefining" (FANG Xiangchen, China Petrochemical Press, 2008) (the contents of these two books are incorporated into the Description of the present Application as reference herein). In one embodiment, the supported metal catalyst is composed of a support and a metal distributed on the support, while the metal may be a single metal, a mixture of metals or an alloy. The metal may be a transition metal in periodic table of elements, selected from a group consisting of metal elements of Group IIIB, Group IVB, Group VB, Group VIB, Group VIIB, and Group VIII. In one embodiment, Group VIII is preferred, and the metal may be selected from Fe, Co, Ni, Ru, Rh, Pd, Os, Ir, Pt, etc. In another embodiment, the metal may be selected from Ni, Co, Mo, W, Cu, Pd, Ru, Pt etc. The content of the metal is 0.1-30 wt %. The support may be selected from an oxide support with double mesoporous composite structure or carbon material. In one embodiment, the oxide support may be selected from $SiO_2$, $Al_2O_3$, $TiO_2$, $SiO_2$—$Al_2O_3$, $Al_2O_3$—$TiO_2$ or $SiO_2$—$Al_2O_3$—$TiO_2$.

The ratio of hydrodeoxygenation catalyst to the reactants which are fed into the second reaction sector is not required to be limited specifically but is determined according to the actual operation conditions.

In one embodiment, the catalytic hydrodeoxygenation in the second reaction sector proceeds under heating at about 200-400° C., for example, at about 200° C., 250° C., 300° C., 350° C., 400° C. or a temperature between any two of the above values. In one embodiment, a temperature at about 300-400° C. is preferred.

Regarding the aforementioned condition for temperature, the operation system may be integrated. The waste gas and waste residue generated from the process can be utilized for heating, which can lower energy consumption, avoid a secondary pollution, and achieve the effects of energy saving and environmental protection.

In a specific embodiment, after vegetable oils are fed into a distillation still to gasify under heating, the gasified vegetable oils are proceeded with catalytic cracking-deoxygenation in the catalytic distillation tower. The temperature of the distillation still is controlled at 100-600° C. The aluminum oxide-molecular sieve mixture is used as a cracking-deoxygenation catalyst, and the ratio of the catalyst to the oils is controlled between 1:5-1:20. The steps of the above reactions may be operated in batch or may be operated continuously by means of a switching-over among the distillation stills. Next, the product from cracking-deoxygenation is mixed with hydrogen gas through a feeding pump and is fed into a reaction reactor equipped with a hydrodeoxygenation catalyst for reaction, in which a supported metal catalyst or a supported metal sulfide catalyst is used as the hydrodeoxygenation catalyst. In the reaction reactor for hydrodeoxygenation, the feeding temperature is controlled at 200-400° C.; the partial pressure of hydrogen gas is 1-6 MPa; the volume space velocity is 0.5-4.0 $h^{-1}$; and the hydrogen/oil volume ratio is 200:1-1200:1. Finally, clean fuel from vegetable oils is obtained, which may be separated into gasoline and diesel according to the temperatures of fractions. In the present invention, the dry gas and waste residue generated in the conversion process of vegetable oils may be used as auxiliary heating.

The biomass fuel produced according to the process of the present invention, such as renewable diesel, may be further processed if required. Isomerization may lower the condensation point of the biomass fuel, and thus, fuel with good properties at low temperature can be obtained.

Following examples are provided to illustrate the present invention in detail. It should be understood that these examples have been presented by way of example only, and are not limiting the present invention.

EXAMPLE 1

Palm acid oil is used as a raw material for the process of the present invention.

The basic properties, component analysis and distilling range of palm acid oil are shown in Table 1. Palm acid oil is solid at room temperature, and the content of free fatty acids thereof is up to 67%. As the content of fatty acids is too high, the palm acid oil can not be treated by using the direct hydrogenation process in the prior art (as foregoing mentioned, the prior art only shows hydrocarbon fuel prepared by direct hydrogenating treatments from raw materials which contain 15% free fatty acids at most). However, palm acid oil can be processed according to the present invention.

TABLE 1

Basic Characteristic Properties of Palm Acid Oil

| Appearance | | | Brown |
|---|---|---|---|
| Moisture content | | %(m/m) | 1.18 |
| Density@15.6° C. | | g/cm³ | 0.9285 |
| Sulphur content | | mg/kg | <50 |
| Free fatty acid content | | % | 67.1 |
| Fat content | | % | 98.0 |
| Iodine value | | $gI_2$/100 g | 51.6 |
| Fatty acid composition | Dodecanoic acid | % | 11.49 |
| | Hexadecanoic acid | % | 24.97 |
| | Octadecanoic acid | % | 17.99 |
| | Oleic acid | % | 31.02 |
| | Others | % | 14.53 |
| Distilling range | | | |
| Initial boiling point | | ° C. | 309 |
| Temperature of 50% recovery | | ° C. | 387.6 |
| Temperature of 90% recovery | | ° C. | 546.5 |
| Temperature of 95% recovery | | ° C. | 581.1 |
| Final boiling point | | ° C. | 587.4 |

Palm acid oil is fed into a distillation still to gasify under heating, and then is proceeded with a catalytic cracking-deoxygenation in a catalytic distillation tower. The temperature of the distillation still is controlled at 100-600° C.; aluminum oxide-molecular sieve mixture is used as a cracking-deoxygenation catalyst; and the ratio of catalyst to the oil is controlled in the range of 1-20. The fractions of gasoline and diesel (<360° C.) are separated according to the temperatures of fractions, and the results are shown in Table 2.

TABLE 2

Distribution of Cracking-deoxygenation Products

| Yield of gasoline and diesel fractions (<360° C.) | Water | Dry gas | Residue |
|---|---|---|---|
| 80% | 6% | 10% | 4% |

Based on the comparison between Table 1 and Table 2, it can be found that the oxygen content of the raw material oil can be lowered by removing oxygen in the form of water by means of the step of catalytic cracking-deoxygenation according to the present invention, and therefore, the decreased water generation in the following hydrogenation lengthens the lifetime of the hydrogenation catalyst. At the same time, the yield of gasoline and diesel fractions is about 80%.

Next, the gasoline and diesel fractions from the catalytic cracking-deoxygenation procedure are mixed with hydrogen gas, and the mixture is fed into a reaction reactor equipped with a hydrodeoxygenation catalyst for reaction, in which a supported metal catalyst or a supported metal sulfide catalyst is used as the hydrodeoxygenation catalyst. Other reaction conditions are listed in Table 3, and the component analysis for the obtained clean fuel is shown in Table 4.

TABLE 3

Conditions of Hydrodeoxygenation

| Hydrogen partial pressure | MPa | 5.0 |
| Volume space velocity | h$^{-1}$ | 1 |
| Hydrogen/oil volume ratio | | 800 |
| Reaction temperature | ° C. | 310 |
| Liquid yield | % | 97 |

TABLE 4

Composition Analysis for Clean Fuel

| Appearance | | Colourless transparent |
|---|---|---|
| Condensation point | ° C. | −3 |
| Hydrogen sulfide | mg/kg | 5.74 |
| Acidity | mgKOH/g | 0.06 |
| Density (20° C.) | kg/m$^3$ | 763.0 |
| Cetane Index | | 64 |
| Distilling range | | |
| Initial boiling point | ° C. | 66.8 |
| Temperature of 50% recovery | ° C. | 215.2 |
| Temperature of 90% recovery | ° C. | 258.1 |
| Temperature of 95% recovery | ° C. | 267.5 |
| Final boiling point | ° C. | 273.7 |

As shown in Table 4, the fractions obtained from the catalytic cracking-deoxygenation of palm acid oil are proceeded with hydrodeoxygenation, and the fractions thus obtained from hydrodeoxygenation have an acid value of 0.06 mg KOH/g, which is much lower than the standard value of Biodiesel Standard in China (hereinafter, BD 1 00). The content of sulfur is lower than the standard value of GB Diesel Standard (III) GB19147-2009 (hereinafter, GB III Diesel) and that of the Euro V Standard EN590:2004 (hereinafter, Euro V Diesel). The Cetane Index is much higher than the standard values of GB III Diesel and Euro V Diesel. According to the method of the present invention, the clean fuel obtained from palm acid oil is indeed an excellent blending component for diesel.

EXAMPLE 2

Jatropha oil is used as raw material for the process of the present invention. Jatropha oil is a liquid at room temperature, and the basic properties, component analysis and distilling range thereof are shown in Table 5.

TABLE 5

Basic Characteristics of *Jatropha* oil

| Appearance | | Yellow transparent |
|---|---|---|
| Moisture content | % (m/m) | <0.05 |
| Density@15.6° C. | g/cm$^3$ | 0.9193 |
| Sulphur content | mg/kg | <50 |
| Free fatty acid content | % | 1.9 |
| Fat content | % | 99.6 |
| Iodine value | gI$_2$/100 g | 103 |
| Distilling range | | |
| Initial boiling point | ° C. | 405.6 |
| Temperature of 50% recovery | ° C. | 573.9 |
| Temperature of 90% recovery | ° C. | 591.7 |
| Temperature of 95% recovery | ° C. | 593.3 |
| Final boiling point | ° C. | 603.5 |

Jatropha oil is fed into a distillation still to gasify under heating, and then is proceeded with catalytic cracking-deoxygenation in a catalytic distillation tower. The temperature of the distillation still is controlled at 100-600° C. Aluminum oxide-molecular sieve mixture is used as a cracking-deoxygenation catalyst. The ratio of catalyst to the oil is controlled in the range of 1-20. The fractions of gasoline and diesel (<360° C.) are separated according to the temperatures of fractions, and the results are shown in Table 6.

TABLE 6

Distribution of Cracking-deoxygenation Products

| Yield of gasoline and diesel fractions (<360° C.) | Water | Dry gas | Residue |
|---|---|---|---|
| 78% | 4% | 13% | 5% |

Based on the comparison between Table 5 and Table 6, it can be found that the oxygen content of the raw material oil can be lowered by removing oxygen in the form of water by means of the step of catalytic cracking-deoxygenation according to the present invention, and therefore, the decreased water generation in the following hydrogenation lengthens the lifetime of the hydrogenation catalyst. At the same time, the yield of gasoline and diesel fractions is about 78%.

Next, the gasoline and diesel fractions from the catalytic cracking-deoxygenation procedure are mixed with hydrogen gas, and the mixture is fed into a reaction reactor equipped with a hydrodeoxygenation catalyst for reaction, in which a supported metal catalyst or a supported metal sulfide catalyst is used as the hydrodeoxygenation catalyst. Other reaction conditions are listed in Table 7, and the component analysis for the obtained clean fuel is shown in Table 8.

TABLE 7

Conditions of Hydrodeoxygenation

| | | |
|---|---|---|
| Hydrogen partial pressure | MPa | 5.0 |
| Volume space velocity | h$^{-1}$ | 1 |
| Hydrogen/oil volume ratio | | 800 |
| Reaction temperature | °C. | 310 |
| Liquid yield | % | 98 |

TABLE 8

Composition Analysis for Clean Fuel

| | | |
|---|---|---|
| Appearance | | Colourless transparent |
| Condensation point | °C. | −15 |
| Hydrogen sulfide | mg/kg | 7.7 |
| Acidity | mgKOH/g | 0.04 |
| Density @20° C. | kg/m$^3$ | 783.7 |
| Cetane Index | | 43.4 |
| Distilling range | | |
| Initial boiling point | °C. | 101.2 |
| Temperature of 50% recovery | °C. | 250.1 |
| Temperature of 90% recovery | °C. | 323.9 |
| Temperature of 95% recovery | °C. | 350.2 |
| Final boiling point | °C. | 372.6 |

As shown in Table 8, the acid value of the fuel obtained from Jatropha oil is much lower than the standard value of BD 100; the content of sulfur is lower than the standard value of GB III Diesel and that of Euro V Diesel; and the Cetane Index reaches the standards for Grade III Diesel.

Example 1 and Example 2 provide applications of non-edible animal and vegetable oils and fats which are either the most difficult to handle or the easiest to handle. By using the process of the present application, both of the two Examples can produce clean fuel with excellent properties. It is also shown that the process of the present invention is not fastidious about the raw materials of biological oils and fats, and the process is applicable to all kinds of biological oils and fats. Even palm acid oil, which is the most difficult to handle in the art, can be used to produce clean fuel with high-quality by using the process of the present invention.

The clean fuel prepared according to the present invention comprises $C_8$-$C_{24}$ as its main carbon chain components. The cetane number of the clean fuel is higher than the traditional petroleum diesel. The clean fuel has a lower density, and does not contain sulfur, nitrogen or aromatic hydrocarbons substantially. Based on the above characteristic properties, the clean fuel produced according to the present invention is an ideal and high quality blending component of diesel, which can be blended with a low value oil (with a lower cetane number) produced by hydrogenating light catalytic cycle oil, so as to produce ultra low sulfur diesel which meets the requirements of relevant standards.

EXAMPLE 3

An example for producing clean fuel according to the present invention is provided on a level of application in industry.

Referring to the FIGURE, raw materials of biological oils and fats are fed into the distillation still 1 and are heated, and then, are guided into the catalytic distillation tower 2, which is equipped with a cracking-deoxygenation catalyst. Cracking-deoxygenation for the biological oils and fats takes place under a certain temperature. The gasoline and diesel fractions thus obtained from the catalytic distillation tower 2 are fed into the hydrorefining reaction reactor 7, in which the gasoline and diesel fractions from the catalytic distillation tower 2 are mixed with hydrogen gas through a feeding pump 5, and then enter into the hydrorefining reaction reactor 7 after being heated by a heat exchanger and the heating furnace 6.

The hydrodeoxygenation catalyst is equipped in the hydrorefining reaction reactor 7. Under a preset temperature, the fractions from the catalytic distillation tower 2 are fed into the hydrorefining reaction reactor 7 and are proceeded with a catalytic hydrodeoxygenation with hydrogen gas. Finally, the obtained product is fed into the atmospheric distillation tower 9 and fractionated to produce clean fuel, such as gasoline, diesel and the like.

In the process of the present invention, through a catalytic cracking-deoxygenation, a large amount of C—O bonds contained in biological oils and fats are first cleaved; and then, through a catalytic hydrodeoxygenation, a final clean fuel is obtained. The process of the present invention lowers effectively the consumption of hydrogen which is required for hydrogenation. Based on the comparison between the present invention and the processes in the prior art, i.e., a two-step process of direct hydrodeoxygenation and then hydroisomerization for biological oils and fats, or a one-step process combining hydrodeoxygenation and hydroisomerization, up to 50% of hydrogen gas consumption is reduced by the present invention. Based on the comparison between the present invention and the process of transesterification in the prior art, the present invention does not require low-carbon alcohols and does not generate by-product glycerol. The process of the present invention is simple to operate and reduces the cost significantly.

The above description of the preferred examples of the present invention is for the purposes of explaining and illustrating, but do not limit the content of the present invention. The scope of the present invention is determined by the Claims. Those ordinary skilled in the art can make appropriate modifications or changes after reading the above description, and all such modifications or changes fall within the scope of the present invention.

What is claimed is:

1. A method for preparing fuel from a biological oil or fat, comprising:
  (a) heating and gasifying a raw material comprising a biological oil or fat in a distillation still to produce a gasified raw material;
  (b) passing the gasified raw material into a catalytic distillation tower and subjecting the gasified raw material to catalytic cracking-deoxygenation by heating the gasified raw material in the presence of a catalytic cracking-deoxygenation catalyst to produce a product, wherein the catalytic cracking-deoxygenation takes place in the gas phase;
  (c) mixing the product of step (b) with hydrogen gas to produce a mixture; and
  (d) subjecting the mixture from step (c) to a catalytic hydrodeoxygenation by heating the mixture in the presence of a hydrodeoxygenation catalyst to produce a hydrodeoxygenation product comprising said fuel.

2. The method according to claim 1, wherein step (b) is operated continuously or in batch.

3. The method according to claim 1, wherein the catalytic cracking-deoxygenation in the catalytic distillation tower is a continuous process and the catalytic hydrodeoxygenation is a continuous process.

4. The method according to claim 1, wherein the raw material is from animal origin, plant origin, microorganism origin or mixtures thereof.

5. The method according to claim 1, wherein the catalytic cracking-deoxygenation catalyst is selected from aluminum oxide, molecular sieves or a mixture thereof.

6. The method according to claim 5, wherein the catalytic cracking-deoxygenation catalyst is a molecular sieve, wherein the molecular sieve is selected from the group consisting of HY, Hβ, SAPO-31, HZSM-5, and HZSM-22.

7. The method according to claim 5, wherein the catalytic cracking-deoxygenation catalyst is a mixture of aluminum oxide and molecular sieve, and wherein the molecular sieve content of the catalytic cracking-deoxygenation catalyst is 5-70 wt %.

8. The method according to claim 1, wherein the catalytic cracking-deoxygenation catalyst is a formed catalyst and a ratio of equivalent diameter of the catalytic cracking-deoxygenation catalyst to the diameter of the catalytic distillation tower is less than 0.1.

9. The method according to claim 1, wherein a mass ratio of the catalytic cracking-deoxygenation catalyst in step (b) to the gasified raw material of step (b) is selected from the group consisting of 1:5, 1:10, 1:15, 1:20, 1:30, 1:40, and 1:50.

10. The method according to claim 1, wherein the catalytic cracking-deoxygenation catalyst is water resistant.

11. The method according to claim 1, wherein the catalytic cracking-deoxygenation takes place at 450-600° C.

12. The method according to claim 1, wherein the product of step (b) comprises alkenes, alkanes, carbon monoxide, carbon dioxide, water or combinations thereof.

13. The method according to claim 1, wherein the hydrodeoxygenation catalyst comprises a supported metal catalyst comprising one or more metals selected from the group consisting of Group IIIB metals, Group IVB metals, Group VB metals, Group VIB metals, Group VIIB metals, Group VIII metals, and alloys thereof.

14. The method according to claim 1, wherein the catalytic hydrodeoxygenation takes place at 200-400° C.

15. The method according to claim 1, further comprising: (e) fractionating the hydrodeoxygenation product comprising said fuel to obtain gasoline and diesel.

16. The method according to claim 1, wherein the product produced by the catalytic cracking-deoxygenation comprises dry gas, wherein the dry gas is used for heating the gasified raw material in step (b) and heating the mixture in step (d).

17. The method according to claim 1, wherein the catalytic hydrodeoxygenation takes place in a hydrodeoxygenation reactor and wherein the product of step (b) passes through a feeding pump before mixing with hydrogen gas in step (c), and then enters into the hydrodeoxygenation reactor through a heat exchanger.

18. The method according to claim 1, wherein the distillation still is operated at a temperature between 450° C. and 600° C., the catalytic cracking-deoxygenation catalyst is a mixture of aluminum oxide and molecular sieves, and the mass ratio of the catalytic cracking-deoxygenation catalyst to the gasified raw material of step (b) is between 1:5 and 1:20.

19. The method according to claim 1, wherein step (d) takes place in a hydrodeoxygenation reactor, the hydrodeoxygenation catalyst is a supported metal catalyst, the mixture is heated to 200-400° C. in the hydrodeoxygenation reactor, the partial pressure of hydrogen gas in the hydrodeoxygenation reactor is 1-6 MPa, the volume space velocity in the hydrodeoxygenation reactor is 0.5-4.0 $h^{-1}$, and the hydrogen/oil volume ratio in the hydrodeoxygenation reactor is in the range of from 200:1 to 1200:1.

20. The method according to claim 1, wherein the gasified raw material comprises free fatty acids and triglycerides and wherein the catalytic cracking-deoxygenation comprises the following reactions:

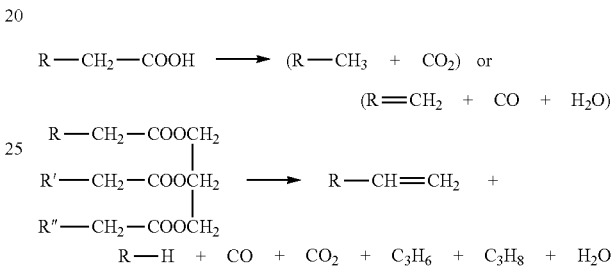

in which R, R', and R" are each an alkyl of $C_{10\text{-}22}$.

21. The method according to claim 1, wherein the mixture of step (c) comprises alkenes, free fatty acids, and triglycerides, and wherein the catalytic hydrodeoxygenation comprises the following reactions:

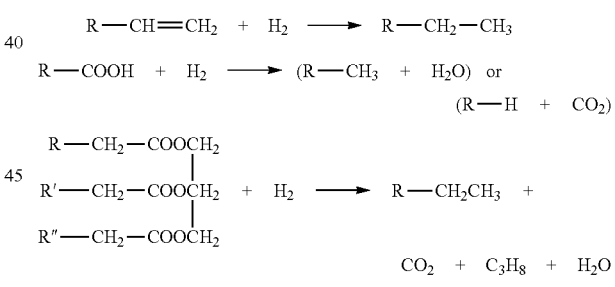

in which R, R', and R" are each an alkyl of $C_{10\text{-}22}$.

* * * * *